(12) United States Patent
Duvinags et al.

(10) Patent No.: US 7,662,197 B2
(45) Date of Patent: Feb. 16, 2010

(54) METHOD OF OPERATING AN EXHAUST GAS CLEANING UNIT WITH PARTICLE FILTER AND NITROGEN OXYGEN STORE

(75) Inventors: Frank Duvinags, Kirchheim/Teck (DE); Stefan Kurze, Markgröningen (DE); Thomas Liebscher, Fellbach (DE); Arno Nolte, Stuttgart (DE); Markus Paule, Remshalden (DE); Norbert Ruzicka, Steinenbronn (DE); Joachim Schommers, Allmersbach i.T. (DE)

(73) Assignee: Daimler AG, Stuttgart (DE)

( * ) Notice: Subject to any disclaimer, the term of this patent is extended or adjusted under 35 U.S.C. 154(b) by 44 days.

(21) Appl. No.: 12/006,923

(22) Filed: Jan. 7, 2008

(65) Prior Publication Data

US 2008/0134648 A1 Jun. 12, 2008

Related U.S. Application Data

(62) Division of application No. 09/929,961, filed on Aug. 15, 2001, now abandoned.

(30) Foreign Application Priority Data

Aug. 15, 2000 (DE) ................................ 100 40 554

(51) Int. Cl.
*B01D 39/00* (2006.01)
*B01D 24/00* (2006.01)
*B01D 39/06* (2006.01)
*B01D 39/14* (2006.01)
*F01N 3/00* (2006.01)

(52) U.S. Cl. .................. 55/282.3; 55/282; 55/282.1; 55/282.2; 55/522; 55/523; 55/524; 60/287; 60/288; 60/289; 60/285; 60/286

(58) Field of Classification Search ................... 55/282, 55/282.1–282.3, 522–524; 60/285–289, 60/28

See application file for complete search history.

(56) References Cited

U.S. PATENT DOCUMENTS

| 4,902,487 | A | * | 2/1990 | Cooper et al. | ............ 423/215.5 |
|---|---|---|---|---|---|
| 5,402,641 | A | * | 4/1995 | Katoh et al. | .................. 60/285 |
| 5,746,989 | A | * | 5/1998 | Murachi et al. | ........... 423/213.7 |

(Continued)

FOREIGN PATENT DOCUMENTS

DE 19920515.9 * 11/2000

(Continued)

*Primary Examiner*—Walter D Griffin
*Assistant Examiner*—Amber Orlando
(74) *Attorney, Agent, or Firm*—Klaus J. Bach

(57) ABSTRACT

In a method for operating an exhaust-gas cleaning unit of a diesel engine including a particle filter and a nitrogen oxide storage device arranged upstream of the particle filter, wherein sulfur regeneration of the nitrogen oxide storage device is performed periodically at raised exhaust gas temperatures and, in certain phases, with a rich exhaust gas composition, and also soot regeneration of the particle filter is performed at raised exhaust gas temperatures with a lean exhaust gas composition, at least some of the sulfur regeneration and the soot regeneration phases are performed in a combined soot and sulfur regeneration phase, and for the sulfur regeneration, at least temporarily, a rich exhaust-gas composition with a temperature higher than the temperature of the lean exhaust gas composition is provided for the soot regeneration of the particle filter.

10 Claims, 2 Drawing Sheets

U.S. PATENT DOCUMENTS

| | | | |
|---|---|---|---|
| 5,809,774 A * | 9/1998 | Peter-Hoblyn et al. | 60/274 |
| 5,974,791 A * | 11/1999 | Hirota et al. | 60/276 |
| 6,161,377 A * | 12/2000 | Boegner et al. | 60/274 |
| 6,230,487 B1 * | 5/2001 | Blumenstock et al. | 60/286 |
| 6,293,096 B1 * | 9/2001 | Khair et al. | 60/286 |
| 6,557,340 B1 * | 5/2003 | Twigg et al. | 60/275 |
| 6,625,974 B1 * | 9/2003 | Herynek | 60/278 |
| 6,637,189 B1 * | 10/2003 | Boegner et al. | 60/274 |
| 2002/0148218 A1 * | 10/2002 | Hertzberg et al. | 60/285 |

FOREIGN PATENT DOCUMENTS

| | | | |
|---|---|---|---|
| EP | 0758713 | * | 2/1997 |

* cited by examiner

METHOD OF OPERATING AN EXHAUST GAS CLEANING UNIT WITH PARTICLE FILTER AND NITROGEN OXYGEN STORE

This is a divisional patent application of patent application Ser. No. 09/929,961 filed Aug. 15, 2001 now abandoned.

FIELD OF THE INVENTION

The invention relates to a method of operating an exhaust gas cleaning unit having a particle filter and a nitrogen oxide store. Exhaust gas cleaning units of this type are suitable in particular for cleaning the exhaust gases of diesel engines of, for example motor vehicles.

BACKGROUND INFORMATION

European Published Patent Application No. 0 758 713 describes an exhaust gas cleaning unit in which an oxidation catalytic converter is connected upstream of the particle filter, as seen in the direction of flow of the exhaust gas, and the nitrogen oxide store is connected downstream of the particle filter. As an alternative to the nitrogen oxide store, a nitrogen oxide reduction catalytic converter may be used. The oxidation catalytic converter is used to convert nitrogen monoxide which is contained in the exhaust gas in soot regeneration phases of the particle filter into nitrogen dioxide, which promotes the soot burn-off in the particle filter. The nitrogen oxide store or the nitrogen oxide reduction catalytic converter is used to collect or convert nitrogen monoxide which is formed by the reaction of the nitrogen dioxide with the soot particles. The soot regeneration operations occur, for example, every 60 minutes for about three minutes with a lean exhaust gas composition and temperatures of between approximately 400° C. and 500° C. Conventional nitrogen oxide regeneration phases for the nitrogen oxide store are performed approximately every 10 seconds to every few minutes, in each case for approximately 0.5 seconds, with a rich exhaust gas composition. When a nitrogen oxide regeneration phase of this type falls in the period of a soot regeneration phase, it is performed, by an additional increase in temperature, as a correspondingly short sulfur regeneration phase, in order to prevent gradual sulfur poisoning of the nitrogen oxide store.

Various methods for nitrogen oxide ($NO_x$) regeneration and sulfur regeneration of a nitrogen oxide store are conventional. For example, German Published Patent Application No. 197 50 226 describes a method for $NO_x$ regeneration in which a desired, rich exhaust gas composition is generated substantially only by engine measures, including suitable control of exhaust gas recycling.

It is an object of the present invention to provide a new type of exhaust gas cleaning unit and a corresponding operating method for this unit.

SUMMARY OF THE INVENTION

In a method for operating an exhaust-gas cleaning unit of a diesel engine including a particle filter and a nitrogen oxide storage device arranged upstream of the particle filter, wherein sulfur regeneration of the nitrogen oxide storage device is performed periodically at raised exhaust gas temperatures and, in certain phases, with a rich exhaust gas composition, and also soot regeneration of the particle filter is performed at raised exhaust gas temperatures with a lean exhaust gas composition, at least some of the sulfur regeneration and the soot regeneration phases are performed in a combined soot and sulfur regeneration phase, and for the sulfur regeneration, at least temporarily, a rich exhaust-gas composition with a temperature higher than the temperature of the lean exhaust gas composition is provided for the soot regeneration of the particle filter.

The exhaust gas cleaning unit of a diesel engine includes a nitrogen oxide store connected upstream of the particle filter. Connecting the nitrogen oxide store upstream of the particle filter, as seen in the direction of flow of the exhaust gas, has a number of particular advantages. For example, nitrogen oxides, which have been temporarily stored in the nitrogen oxide store, may be liberated at the elevated exhaust gas temperature which is required for soot regeneration of the particle filter and may additionally assist the soot regeneration in the form of nitrogen dioxide ($NO_2$). Furthermore, sulfur regeneration of the nitrogen oxide store, which requires relatively high exhaust gas temperatures of typically between 600° C. and 700° C., may be combined with soot regeneration of the particle filter, for which elevated exhaust gas temperatures of between approximately 400° C. and approximately 600° C. are generally used, the fact that the nitrogen oxide store is connected upstream of the particle filter resulting in a natural temperature gradient along the exhaust gas flow which matches these temperature requirements.

A respective oxidation catalytic converter may be provided upstream of the nitrogen oxide store, between the nitrogen oxide store and the particle filter and/or downstream of the particle filter. Depending on the particular arrangement, an oxidation catalytic converter of this type assists with raising the exhaust gas temperature, soot regeneration by generating $NO_2$ and/or avoiding hydrocarbon (HC) and/or carbon monoxide (CO) emissions.

An $HC/CO/O_2$ storage coating and/or an oxidation catalyst coating and/or a coating which promotes the oxidation of soot may be provided in the particle filter, preferably in each case in an inlet-side part thereof. Thus, unburned hydrocarbons and carbon monoxide may be trapped or oxidized and/or the soot burn-off during the particle filter regeneration may be assisted.

An exhaust gas according to the present invention may include a lambda probe downstream of the particle filter. This probe may be used to monitor the soot burn-off behavior during the particle regeneration and to detect any breakthrough of reducing agents during the $NO_x$ regeneration of the nitrogen oxide store.

The operating method according to the present invention includes firstly sulfur regeneration phases for the nitrogen oxide store, which are performed for a longer period than the $NO_x$ regeneration phases, in order to achieve complete sulfur desorption. Moreover, combined sulfur and soot regeneration phases are provided, during which the sulfur regeneration of the nitrogen oxide store and the soot regeneration of the particle filter may be linked in terms of time by the two regeneration operations being performed immediately after one another or by one regeneration operation being performed intermittently at intervals during the other regeneration operation. In this manner, the thermal exhaust gas energy may be utilized for both regeneration processes.

In the operating method according to the present invention, a lambda probe downstream of the particle filter may be used firstly to detect the progress of a soot regeneration phase and secondly to detect a breakthrough of reducing agents during a nitrogen oxide regeneration phase and therefore that the latter phase has ended.

DETAILED DESCRIPTION

Figure 1:
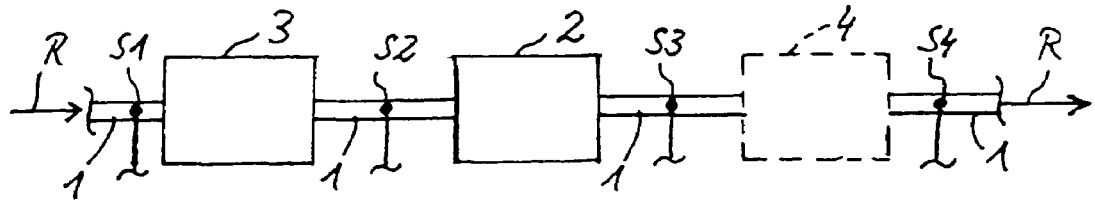
FIG. 1 is a schematic block diagram of an exhaust gas cleaning unit for a diesel engine having a particle filter, an upstream nitrogen oxide store and an optional downstream oxidation catalytic converter.

The exhaust gas cleaning unit, only the relevant components of which are illustrated in FIG. 1, is suitable in particular for cleaning the exhaust gas from a diesel engine, for example in a motor vehicle. The exhaust gas cleaning unit includes, as components which are active in the exhaust gas cleaning in an exhaust system 1, a particle filter 2 and a nitrogen oxide store 3 which is connected upstream of the particle filter 2, as seen in the direction R of flow of the exhaust gas, as well as, optionally, an oxidation catalytic converter 4 connected downstream of the particle filter 2.

A control unit, which may be formed, for example, by an engine control unit which control the exhaust-emitting diesel engine, is used to control the operation of the exhaust gas cleaning unit. The control unit determines the operating state of the exhaust gas cleaning unit using various sensors arranged in the exhaust system 1. These sensors include in particular a first sensor arrangement S1. Upstream of the nitrogen oxide store 3, for detecting the lambda value, the nitrogen oxide content and the temperature of the exhaust gas, a second and third sensor arrangement S2, S3 between the nitrogen oxide store 3 and the particle filter 2 and downstream of the latter, respectively, in each case to determine pressure and temperature, and, also downstream of the particle filter 2, upstream or downstream of the oxidation catalytic converter 4, a fourth sensor arrangement or lambda probe S4 for determining the lambda value and oxygen and/or nitrogen oxide content. Depending on the particular application, only some of the above-mentioned sensors may be provided.

Figure 2:
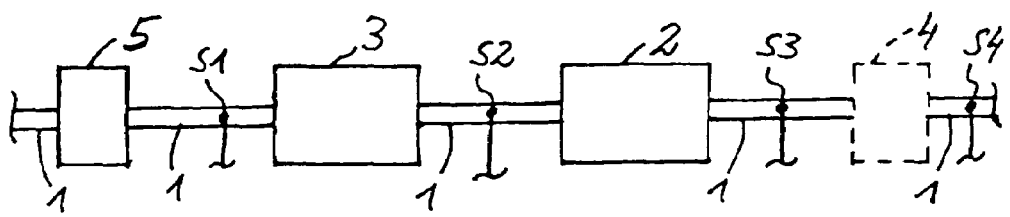
FIG. 2 is a schematic block diagram of an exhaust gas cleaning unit having an oxidation catalytic converter disposed upstream of the nitrogen oxide store.
Figure 3:
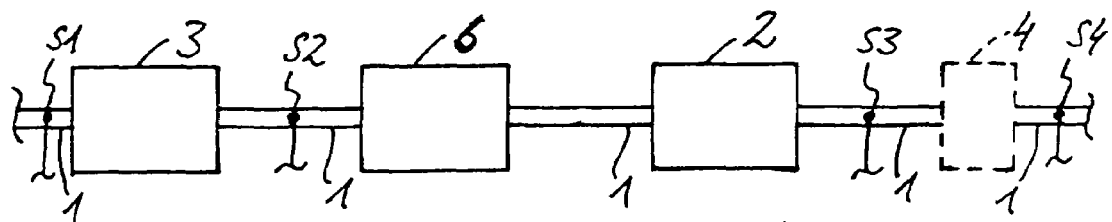
FIG. 3 is a schematic block diagram of an exhaust gas cleaning unit having an oxidation catalytic converter disposed between the nitrogen oxide store and the particle filter.
Figure 4:
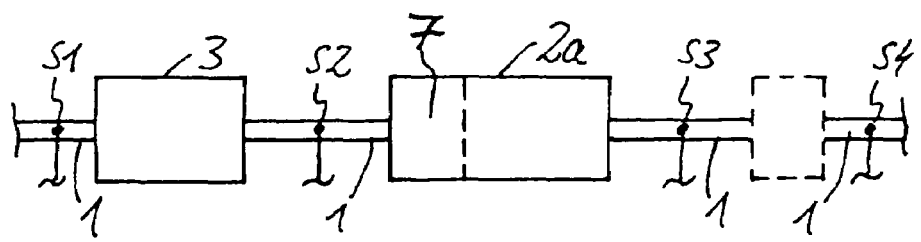
FIG. 4 is a schematic block diagram of an exhaust gas cleaning unit having a particle filter that includes a coating configured to perform an exhaust gas cleaning function.
Figure 5:
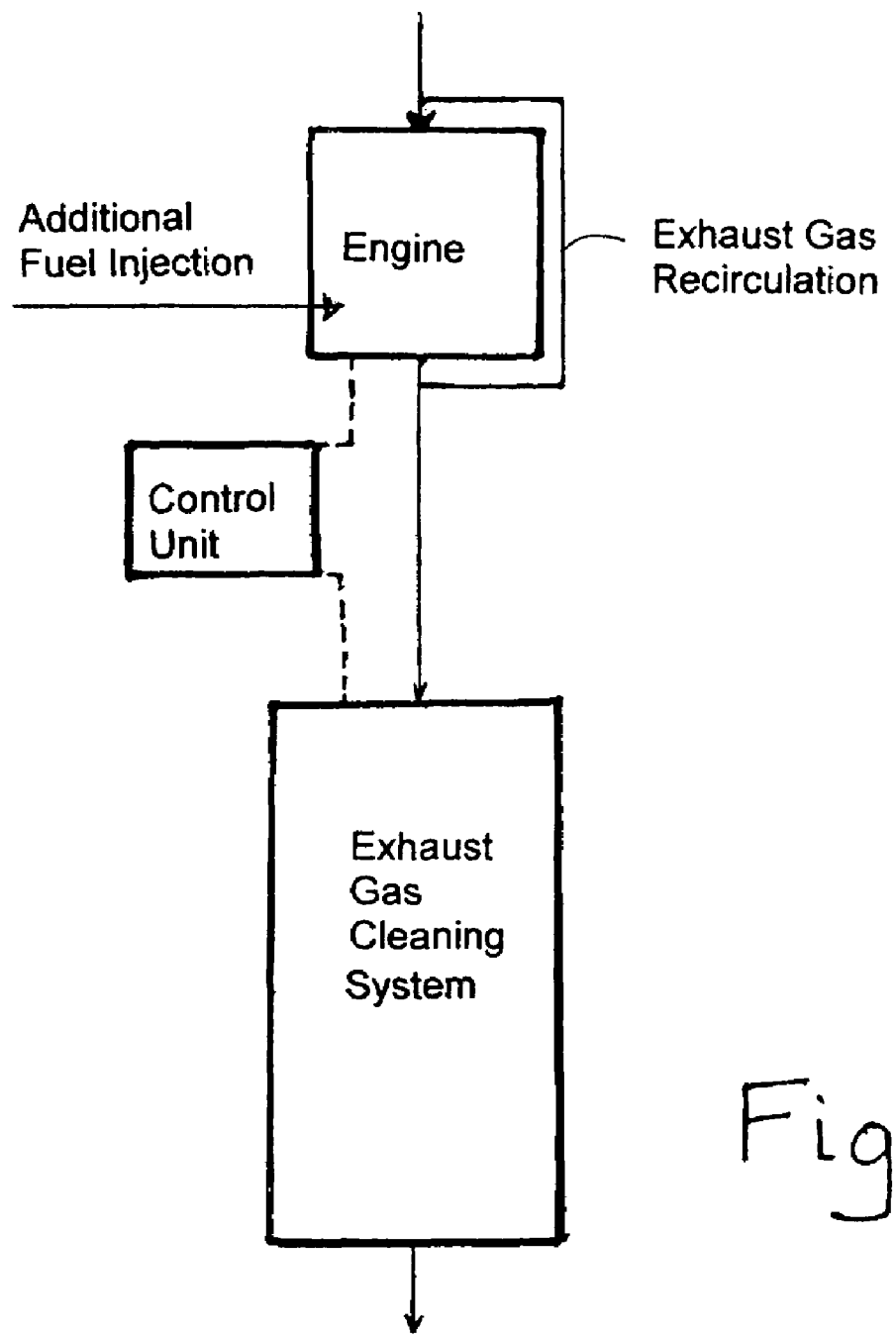
FIG. 5 shows schematically the engine with the exhaust gas purification system.

FIGS. 2 to 4 illustrate variants of the unit illustrated in FIG. 1. In the unit illustrated in FIG. 2, an oxidation catalytic converter 5 is additionally provided upstream of the nitrogen oxide store 3. In this case, the optional oxidation catalytic converter 4 downstream of the particle filter 2 may be smaller.

In the exhaust gas cleaning unit illustrated in FIG. 3, an oxidation catalytic converter 6 is connected between the nitrogen oxide store 3 and the particle filter 2. Again, the optional oxidation catalytic converter 4 downstream of the particle filter 2 may be smaller.

The exhaust gas cleaning unit illustrated in FIG. 4 uses a modified particle filter 2a, which, in an inlet-side section 7, includes particles provided with a coating which is active in cleaning of the exhaust gas. Depending on the particular application, this coating is selected so that it fulfills an oxidation catalyst function or an $HC/CO/O_2$ storage function or a function of promoting soot burn-off. Suitable materials for such coatings are conventional and therefore require no further explanation. In the first case, the coating acts as an oxidation catalyst, i.e., it catalyzes oxidation of gaseous, oxidizable exhaust gas constituents. In the second case, the coating serves to store unburned hydrocarbons, carbon monoxide or oxygen contained in the exhaust gas at the inlet side of the particle filter 2a, depending on the operating state of the diesel engine and of the exhaust gas cleaning unit. In this manner, it is possible, for example, to prevent a breakthrough of unburned hydrocarbons and of carbon monoxide. In the third case, the coating serves as an oxidation aid in the soot burn-off during the soot regeneration of the particle filter, with the result that the soot burn-off may occur even at relatively low temperatures.

Because the nitrogen oxide store 3 is arranged upstream of the particle filter 2, each of the installations illustrated may be operated so that the functions of these two exhaust gas cleaning components 2, 3 may be adapted to one another and assist one another with optimum utilization of the thermal energy contained in the exhaust gas. As is conventional, the nitrogen oxide store 3 fulfills the nitrogen oxide reduction function, by temporarily storing nitrogen oxides, for example by adsorption in nitrate form, during lean operation of the diesel engine and releasing them and reducing them to form nitrogen during periodic regeneration or desorption phases. These $NO_x$ regeneration phases are performed at typical intervals of one to a few minutes, for a period of typically slightly less than one second to a few seconds, during which period a rich exhaust gas composition is set. Any secondary emissions of unburned hydrocarbons and carbon monoxide which arise may be oxidized by the subsequent oxidation catalytic converter(s) 4, 6.

In the unit illustrated in FIG. 4, a breakthrough of unburned hydrocarbons and/or carbon monoxide may also be prevented as a result of the coatings of the particles in the inlet-side section 7 containing a material which has an $HC/CO/O_2$ storage function and, depending on the exhaust gas atmosphere and exhaust gas temperature, is able to temporarily store hydrocarbons and carbon monoxide and/or to oxidize them using temporarily stored oxygen.

The particle filter 2 collects particles contained in the exhaust gas for a running distance of typically of the order of magnitude of a few hundred kilometers or several operating hours of the diesel engine, until its storage capacity is reached, after which it is subjected to soot regeneration. For this soot regeneration, the exhaust gas is raised to a suitably high temperature of typically 400° C. to 600° C. by corresponding engine measures, and a lean exhaust gas composition with an oxygen content of preferably greater than 5% is established. This operation is typically performed for a few minutes, after which period the soot has been completely burnt off and the particle filter 2 has been regenerated.

The soot regeneration of the particle filter 2 may be assisted by the upstream nitrogen oxide store 3 as a result of the latter previously being laden with nitrogen oxides. Then, as soon as the exhaust gas temperature for starting a soot regeneration operation is raised to over 400° C., e.g., to over 450° C., the nitrogen oxide store 3, under the lean exhaust gas atmosphere, releases additional $NO_2$ which acts as a soot burn-off agent and assists soot burn-off in the downstream particle filter, which begins at particle filter temperatures of below 400° C., with the result that the regeneration speed of the particle filter 2 is increased. If the diesel engine includes an exhaust gas recycling system, the soot regeneration of the particle filter 2 may be enhanced further by deactivating the exhaust gas recycling during this period, leading to higher $NO_x$ raw emissions. As a result, additional nitrogen dioxide for accelerated soot burn-off is provided to the upstream oxidation catalytic converter 5 directly and via the oxidation of nitrogen monoxide to form $NO_2$ in the $NO_x$ store 3.

If, in the unit illustrated in FIG. 4, the particle filter coating 7 is formed by a material which assists with soot oxidation, the soot burn-off is promoted by this coating 7, which has the effect of causing the soot to be burnt off even at a relatively low temperature.

When using sulfur-containing operating substances, in particular fuel and oil, for the diesel engine, the nitrogen oxide store 3 may gradually become covered with sulfur contained in the exhaust gas and, as a result, loses its ability to store $NO_x$. In order for the sulfur which has been incorporated in the nitrogen oxide store 3, generally in sulfate form, to be released again, it is conventional to perform corresponding desulfating phases from time to time. These phases are typically required in each case after a few thousand operating kilometers and if possible are maintained for a few minutes, typically up to about 15 minutes for complete sulfur regeneration. The sulfur regeneration requires the nitrogen oxide store 3 to be heated to a relatively high temperature of, typically, above 600° C., e.g. to 650° C.

The times at which a sulfur regeneration of the nitrogen oxide store 3 is performed may be linked to soot regeneration of the particle filter 2, since both operations require elevated exhaust gas temperatures and therefore the elevated thermal exhaust gas energy may be utilized for both regeneration operations. By way of example, sulfur regeneration may be performed immediately before or immediately after a soot regeneration. A further possibility is for both regeneration processes to be performed quasi-simultaneously, as a result of the process parameters for one regeneration operation being established in principle for over and above a certain period, but during this period the process parameters are intermittently switched over for brief periods to those required for the other operation. By way of example, it is possible during soot regeneration of the particle filter 2, during which in principle a lean exhaust gas composition is established, to intermittently, for example every 15 seconds to 60 seconds, switch over for a brief period of, for example, three seconds to 10 seconds, to a rich exhaust gas composition, and in this manner to bring about sulfur regeneration of the nitrogen oxide store 3.

This time-matching of soot regeneration of the particle filter 2 and sulfur regeneration of the nitrogen oxide store 3 is assisted by the specific arrangement of the nitrogen oxide store 3 upstream of the particle filter 2 and the standard temperature gradient in the exhaust system 1, since this arrangement means that, at a given, elevated exhaust gas temperature, the nitrogen oxide store 3 tends to be at a higher temperature than the particle filter 2 which follows it downstream. In this manner, it is possible, without further additional heating measures, to set the temperature of, for example, 650° C., which is required for the sulfur regeneration in the nitrogen oxide store 3 and, at the same time, to set the slightly lower temperature of approximately 400° C. to 600° C. required for soot regeneration in the particle filter 2.

Moreover, the relatively high thermal inertia of the particle filter, which results from its mass, does not cause any delay to the temperature control of the $NO_x$ store 3. Furthermore, the increase in the exhaust gas temperature may be at least partially affected by oxidation, for example, of additionally injected fuel.

Connecting the oxidation catalytic converter 5 upstream of the nitrogen oxide store 3, in accordance with the unit illustrated in FIG. 2, given its particularly high temperature stability, may contribute to protecting the nitrogen oxide store 3 from very high exothermic temperatures during this oxidation, in that it oxidizes at least some of the oxidizable constituents contained in the exhaust gas, and as a result, at least partially relieves the nitrogen oxide store 3 of this oxidation function. In this manner, the thermal aging of the nitrogen oxide store 3 may be minimized.

As the above description of example embodiments illustrates, the exhaust gas cleaning unit according to the present invention and the associated operating method according to the present invention allow the thermal exhaust gas energy to be utilized for the regeneration operations of both the nitrogen oxide store 3 and the particle filter 2. Moreover, the upstream nitrogen oxide store 3 is able to assist and accelerate the soot regeneration of the particle filter 2 by additionally providing nitrogen oxide and by increasing the exhaust gas temperature by exothermic oxidation of, for example, fuel which is introduced into the exhaust gas by additional injection into the diesel engine.

The exhaust gas sensor arrangements S1 to S4 of the exhaust gas cleaning unit, for measuring the temperature, the pressure and the nitrogen oxide and oxygen content in the exhaust gas at the various locations of the exhaust systems, may be used to control the sequence of the various regeneration operations described above. For example, arranging the lambda probe S4 downstream of the particle filter 2 upstream or downstream of the optional oxidation catalytic converter 4 allows the exhaust gas to be monitored both with regard to a breakthrough of reducing agent during nitrogen oxide regeneration phases, which indicates that the nitrogen oxide desorption has been completed, and with regard to the oxygen content during the soot regeneration of the particle filter 2, with the result that the burn-off behavior of the soot may be determined and complete conclusion of the soot burn-off may be detected.

What is claimed is:

1. A method for operating an exhaust-gas cleaning unit of a diesel engine with exhaust gas recirculation including a particle filter and a nitrogen oxide storage device arranged upstream of the particle filter, wherein, in phases, sulfur regeneration of the nitrogen oxide storage device is performed periodically at raised exhaust gas temperatures and, at least in certain phases, with a rich exhaust gas composition, and soot regeneration of the particle filter is performed, for certain phases, at raised exhaust gas temperatures with a lean exhaust gas composition, the method comprising the steps of:

performing at least some of the sulfur regeneration and the soot regeneration phases in the form of a combined soot and sulfur regeneration phase, and providing, during the combined sulfur and soot regeneration phase, for the sulfur regeneration, at least temporarily, a rich exhaust-gas composition with a temperature higher than the temperature of the lean exhaust gas composition which is provided for the period of soot regeneration of the particle filter, and, during the soot regeneration period, deactivating the exhaust gas recirculation, and intermittently regenerating the nitrogen oxide storage device for shorter periods and at lower exhaust gas temperatures than are employed for the sulfur regeneration just for the removal of the nitrogen oxides by an exhaust gas having, at least for a predetermined time, a rich composition.

2. The method according to claim 1, wherein, during an extended soot regeneration phase of the particle filter, intermittently several short sulfur regeneration phases are provided for the sulfur regeneration of the nitrogen oxide storage device.

3. The method according to claim 1, wherein, during an extended sulfur regeneration phase, intermittently, several short soot regeneration phase periods are provided for the soot regeneration of the particle filter.

4. The method according to claim 1, wherein a soot regeneration phase is performed immediately followed by a sulfur regeneration phase.

5. The method according to claim 1, wherein a sulfur regeneration phase is performed immediately followed by soot regeneration phase.

6. The method according to claim 1, wherein, with a lambda sensor arranged downstream of the particle filter, the exhaust gas composition is monitored during the nitrogen oxide regeneration phases for an appearance of a reduction medium concentration increase (carbon concentration) indicating a completion of the $NO_x$ regeneration procedure.

7. The method according to claim 1, wherein, during a soot regeneration phase of the particle filter, the soot removal is enhanced by at least one of: operating the diesel engine so as to increase the nitrogen oxide emissions of the diesel engine and providing to the particle filter nitrogen dioxide released from the nitrogen oxide storage device.

8. The method according to claim 1, wherein, for increasing the exhaust gas temperature, fuel introduced into the exhaust gas is oxidized in an oxidation catalytic converter arranged upstream of the nitrogen oxide storage device.

9. The method according to claim 8, wherein the fuel is introduced into the exhaust gas by a fuel post injection into the diesel engine.

10. The method according to claim 1, wherein a particle filter is used which has a coating designed to perform at least one of an oxidation catalytic converter function, an $HC/CO/O_2$ storage function and a soot oxidation enhancement function.

* * * * *